United States Patent
Hung

(10) Patent No.: US 9,428,107 B2
(45) Date of Patent: Aug. 30, 2016

(54) ELECTROPLATING LIGHT-TRANSMISSIVE DECORATION PANEL FOR REAR LICENSE PLATE

(71) Applicant: SAN YUAN DESIGN CO., LTD., Taoyuan County (TW)

(72) Inventor: Peng-Hsiang Hung, Taoyuan County (TW)

(73) Assignee: SAN YUAN DESIGN CO., LTD., Taoyuan County (TW)

( * ) Notice: Subject to any disclaimer, the term of this patent is extended or adjusted under 35 U.S.C. 154(b) by 91 days.

(21) Appl. No.: 14/615,445

(22) Filed: Feb. 6, 2015

(65) Prior Publication Data
US 2015/0307021 A1   Oct. 29, 2015

(30) Foreign Application Priority Data

Apr. 28, 2014   (TW) .............................. 103207379 U

(51) Int. Cl.
| | | |
|---|---|---|
| *B60Q 1/56* | (2006.01) | |
| *B60Q 1/26* | (2006.01) | |
| *G09F 13/22* | (2006.01) | |
| *F21S 8/10* | (2006.01) | |
| *G09F 13/04* | (2006.01) | |

(52) U.S. Cl.
CPC ............... *B60Q 1/56* (2013.01); *B60Q 1/263* (2013.01); *B60Q 1/2669* (2013.01); *B60Q 1/2696* (2013.01); *F21S 48/215* (2013.01); *F21S 48/2206* (2013.01); *F21S 48/2243* (2013.01); *F21S 48/2268* (2013.01); *F21S 48/2281* (2013.01); *G09F 2013/044* (2013.01)

(58) Field of Classification Search
CPC ...... B60Q 1/56; B60Q 1/263; B60Q 1/2626; B60Q 1/2669; B60Q 1/2696; F21S 48/215; F21S 48/2206; F21S 48/2243; F21S 48/2268; F21S 48/2281; G06F 2013/044; B60R 13/10; B60R 13/105
See application file for complete search history.

(56) References Cited

U.S. PATENT DOCUMENTS

| | | | | |
|---|---|---|---|---|
| 4,965,950 A | * | 10/1990 | Yamada ................... | B60Q 1/56 362/613 |
| 6,575,611 B2 | * | 6/2003 | Kugler ................. | B60Q 1/2696 362/543 |
| 6,834,906 B2 | * | 12/2004 | Vaitus ...................... | B60J 5/101 296/106 |
| 7,220,032 B2 | * | 5/2007 | Mori .................... | B60Q 1/2615 296/180.1 |
| 7,537,256 B2 | * | 5/2009 | Gates ....................... | B60Q 1/56 296/1.07 |
| 9,016,910 B2 | * | 4/2015 | Bingle .................. | B60R 13/005 362/459 |
| 2010/0078946 A1 | * | 4/2010 | Sun .......................... | B60Q 1/22 292/336.3 |
| 2011/0090709 A1 | * | 4/2011 | Wang ................... | B60Q 1/2669 362/501 |
| 2015/0022994 A1 | * | 1/2015 | Bingle .................... | G01D 13/20 362/23.01 |

* cited by examiner

*Primary Examiner* — Alan Cariaso
(74) *Attorney, Agent, or Firm* — Leong C. Lei

(57) ABSTRACT

An electroplating light-transmissive decoration panel for a rear license plate, configured with a plurality of accepting grooves on a framework for the accommodation of corresponding LED light boards of a light emitting module; a letter plate with hollowed-out graph-typed and/or letter-typed slots are covered in front of the LED light boards; a cover is made of a light transmissible material, the surface thereof being treated by means of sputter coating to form a sputter coating film, and coupled to the framework with fixing elements and then mounted above the rear license plate; a power line extended from the light emitting module is connected to a power source of a tail light. Whereby, when the decoration panel is not energized, the surface can display a highly textured electroplating matte effect, and when energized, light from the LED light boards passes through the letter plate to show preset graphs and/or letters.

4 Claims, 5 Drawing Sheets

ELECTROPLATING LIGHT-TRANSMISSIVE DECORATION PANEL FOR REAR LICENSE PLATE

TECHNICAL FIELD OF THE INVENTION

The present invention relates to an electroplating light-transmissive decoration panel for a rear license plate, and more particularly to a decoration panel structure, allowing it to not only have a highly textured and eye-appealing electroplating effect but display preset a pattern of graphs and/or characters through a light source so as to form a technologic, voguish and safety decoration panel structure. Thereby, the present invention is suitable particularly for vehicles such as automobiles, motorcycles or the like.

DESCRIPTION OF THE PRIOR ART

Car penetration is higher and higher; cars not only are a convenient transportation tool but present the characterization of individual lifestyle so that many people like putting some decorations on their cars to display their individual lifestyle. Therefore, if a highly qualified decoration panel is developed, it will without doubt meet market's requirement, and much more, the decoration panel itself is a novelty product expected by consumers.

SUMMARY OF THE INVENTION

The main object of the present invention is to provide an electroplating light-transmissive decoration panel for a rear license plate, designed into a decoration panel structure having a highly-technological, voguish light-transmissive metallically-textured electroplating surface by means of sputter coating surface treatment and hidden light emitting graphs or/and letters.

To achieve the object mentioned above, the present invention proposes an electroplating light-transmissive decoration panel for a rear license plate, mainly including: a cover, made of a light transmissible material, a surface thereof being formed into a sputter coating film by means of sputter coating treatment, and locking holes being configured inside the cover; a framework, a front side thereof being configured with a plurality of accepting grooves in communication with each other, and a rear side thereof being configured with coupling portions with a through hole, allowing screw elements to be passed through to lock in the locking holes of the cover, and a plurality of coupling portions with an engagement groove for the mounting thereof on a sheet metal above a rear license plate; a light emitting module, configured with a plurality of LED light boards in electric connection with each other and accommodated in the accepting grooves of the framework correspondingly, one side of the light boards being in electric with a controller capable of controlling lights transform, and one end of the controller being extended with a power line for the connection thereof to a power source of a tail light; and a letter plate, covered in front of the LED light boards, and hollowed-out graph-typed and/or letter-typed slots being configured on the light boards.

The effective gain of the present invention is in that the electroplating light-transmissive decoration panel for a rear license plate can display a highly textured electroplating mirror effect on the surface thereof while being not energized, and the light from the LED light sources is allowed to pass through the letter plate to show the preset graphs and/or letters after the decoration panel is energized, capable of increasing a warning effect when a vehicle is braked.

BRIEF DESCRIPTION OF THE DRAWINGS

FIG. 2A is an enlarged view of a portion of FIG. 2;

DETAILED DESCRIPTION OF THE PREFERRED EMBODIMENTS

Figure 1:
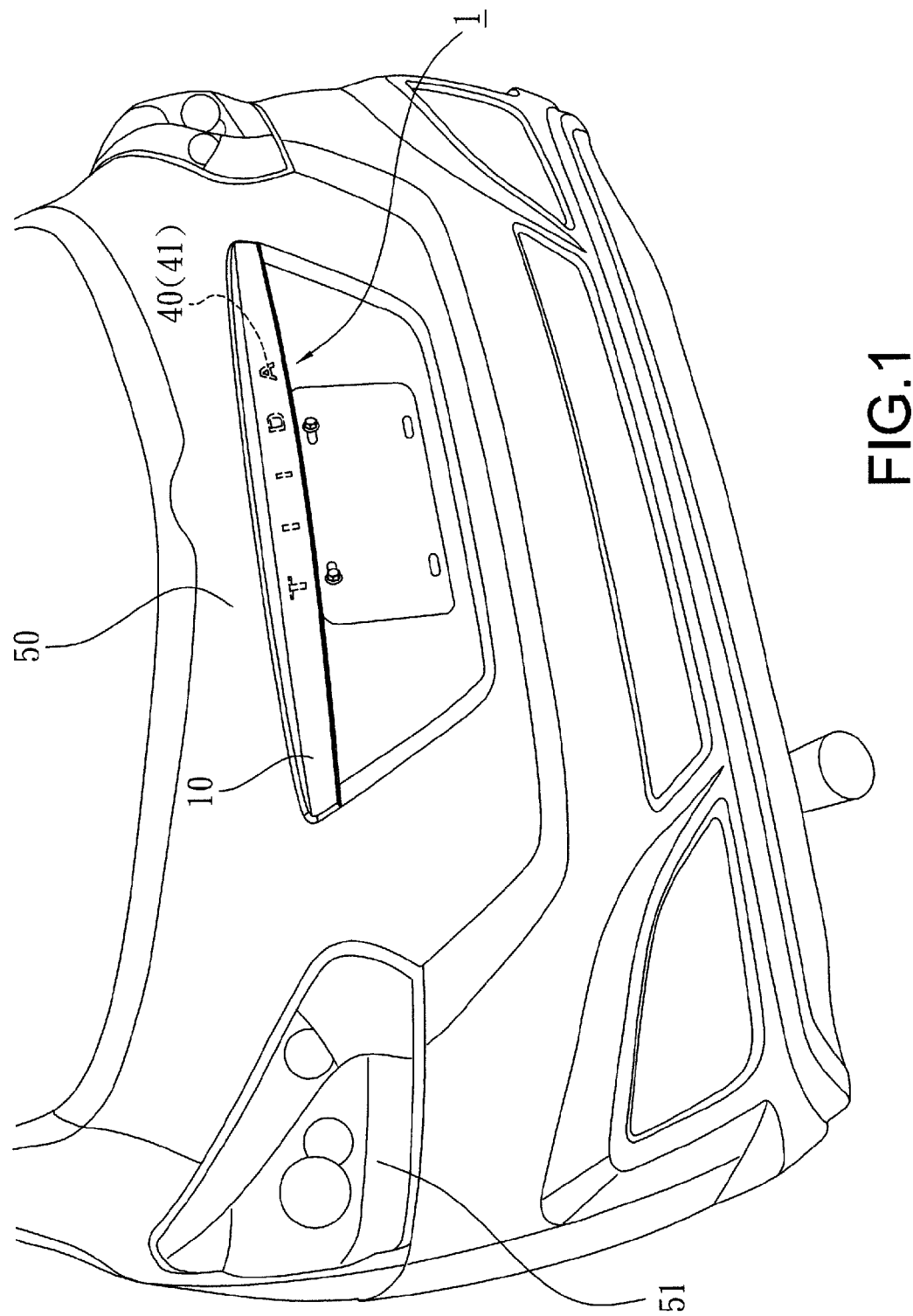
FIG. 1 is a perspective view of the present invention in a use state.

Referring to FIGS. 1 to 4, an electroplating light-transmissive decoration panel 1 for a rear license plate according to the present invention includes a cover 10, a framework 20, a light emitting module 30 and a letter plate.

The cover 10 may be made of a light transmissible material, and the inside thereof is configured with some locking holes 11 and the surface is formed with a sputter coating film 12 treated by means of sputter coating, the film thickness being set in the range from 0.1 μm to 1 μm such that the cover 10 can perform highly textured electroplating effect and allows the light from the light sources to penetrate through the back side of the cover 10, thereby achieving the best use effect.

Furthermore, a plurality of accepting grooves 21 in communication with each other are configure on the front side of the framework 20, and a plurality of coupling portions 23 with a through hole 22 (see FIG. 3) and a plurality of coupling portions 25 with a slot 24 are configured on a plate at the rear side of the framework 20.

Furthermore, a plurality of LED light boards respectively corresponding to the accepting grooves 21 on the framework 20 and in electric connection with each other are configure on the light emitting module 30. In the embodiment, the LED light board 31 is made of acrylic or soft silicone gel, the surface of which is treated by means of sandblasting to form a matted surface. Furthermore, a light bar 32 is respectively inlaid in the two sides of each light board 21, allowing the light board 31 to be formed into an LED light board 31 having a dual-color light emitting effect, as FIG. 2A shows. In addition, one side of the light boards 31 is in electric with a controller 33 adapted to control the lights transform, and one end of the controller 33 is extended with a power line 34.

Furthermore, the letter plate 40 is covered in front of the LED light boards 31, and hollowed-out letter-typed and/or graph-typed frame slots 41 are configured on a plate body of the letter plate 40.

Upon assembly, the LED light boards 31 of the light emitting module 31 together with the letter plate 40 attached to the front of the light boards 31, first of all, are inlaid into the accepting grooves 21 of the framework 20 correspondingly, and the power line 34 is passed through the current assembly to the outside. Next, the cover 10 is in turn covered onto the framework 20 and at the same time screws 26 are used to pass through the through holes 22 of the coupling portions 23 of the framework 20 to lock in the locking holes 11 of the cover 10, thereby coupling the cover 10 to the framework 20 so as to form a decoration panel 1.

Figure 2:
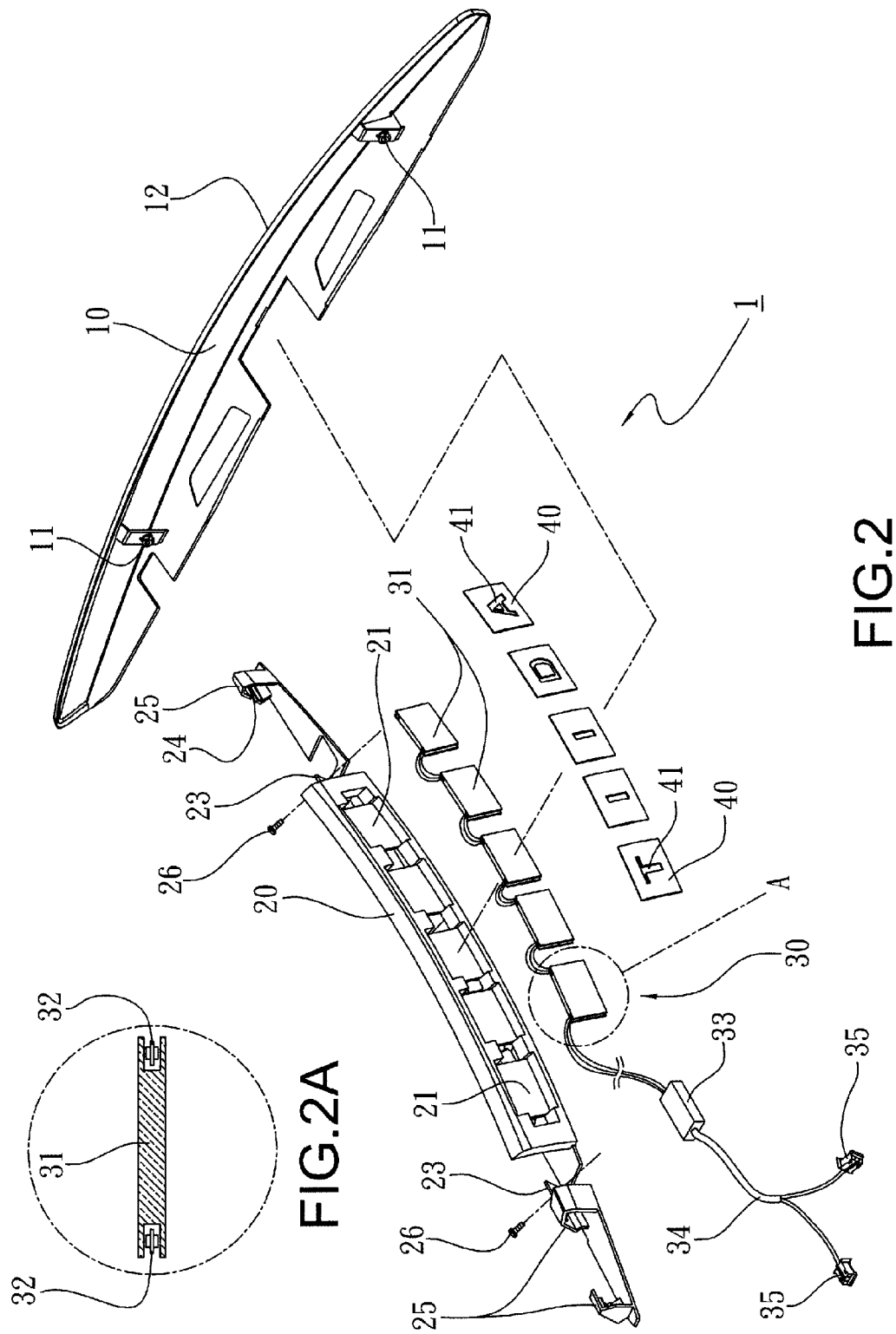
FIG. 2 is an exploded view of the present invention.
Figure 3:
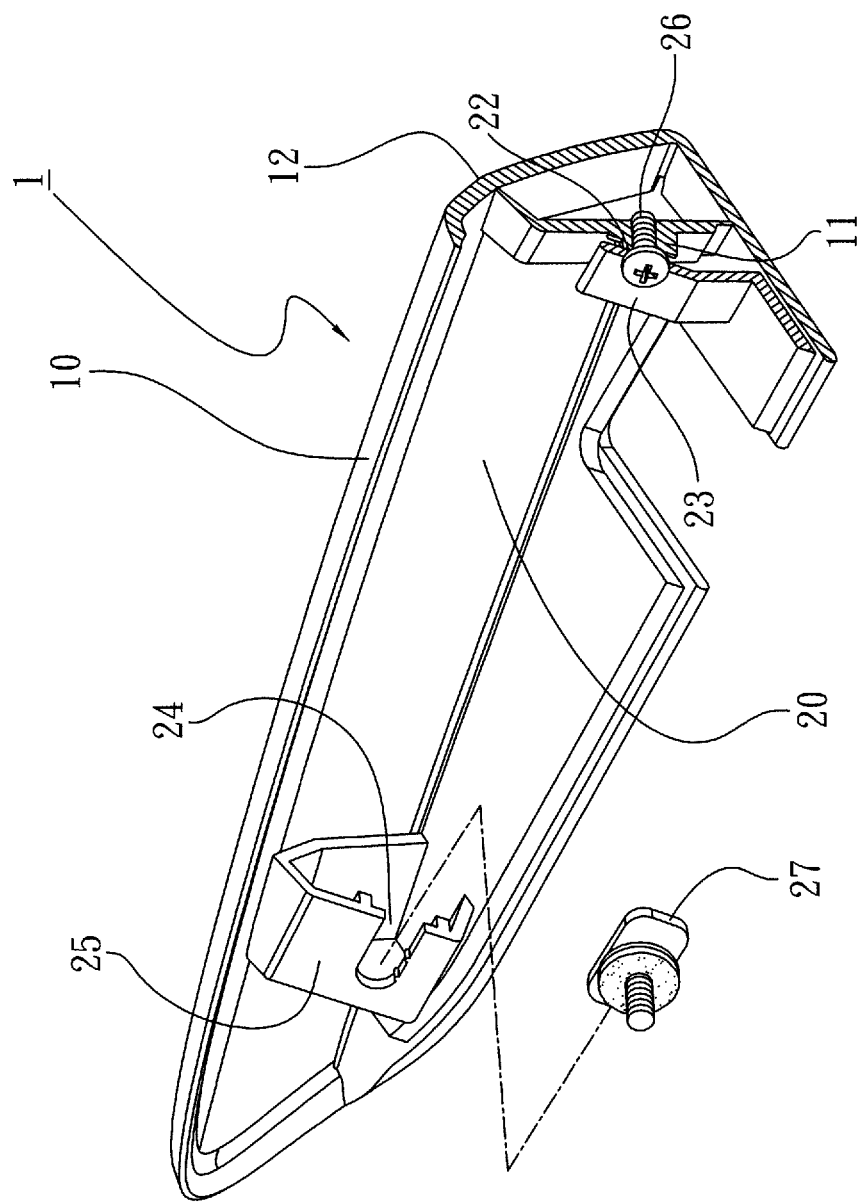
FIG. 3 is a partly cross-sectional view of a thee-dimensional structure of the present invention.

Referring to FIGS. 3 and 4 again, when the decoration panel 1 of the present invention is mounted on an automobile for use, general fixation elements such as automobile interior fasteners, rivets, snaps or the like may be used to passed through the coupling portions 25 configured on the framework 20 to fix on the automobile sheet metal positioned above the rear license plate, or fixing elements 27 configured in the embodiment may be first used to fix in the slots 24 of the coupling portions 25, and then passed through nuts 28 to fix onto the sheet metal 50 stably as FIGS. 3 and 4 show. Subsequently, the power line 34 extended to the outside of the decoration panel 1 is connected electrically to the power source of a tail light 51 of the automobile, thereby completing the mounting of the present invention on the automobile. Upon implementation, the tail end of the power line 34 of the light emitting module may be connected to a electrical contact 35 as FIG. 2 shows, thereby being convenient for a user to insert the power line 34 in the power source of the tail light 51.

Figure 4:
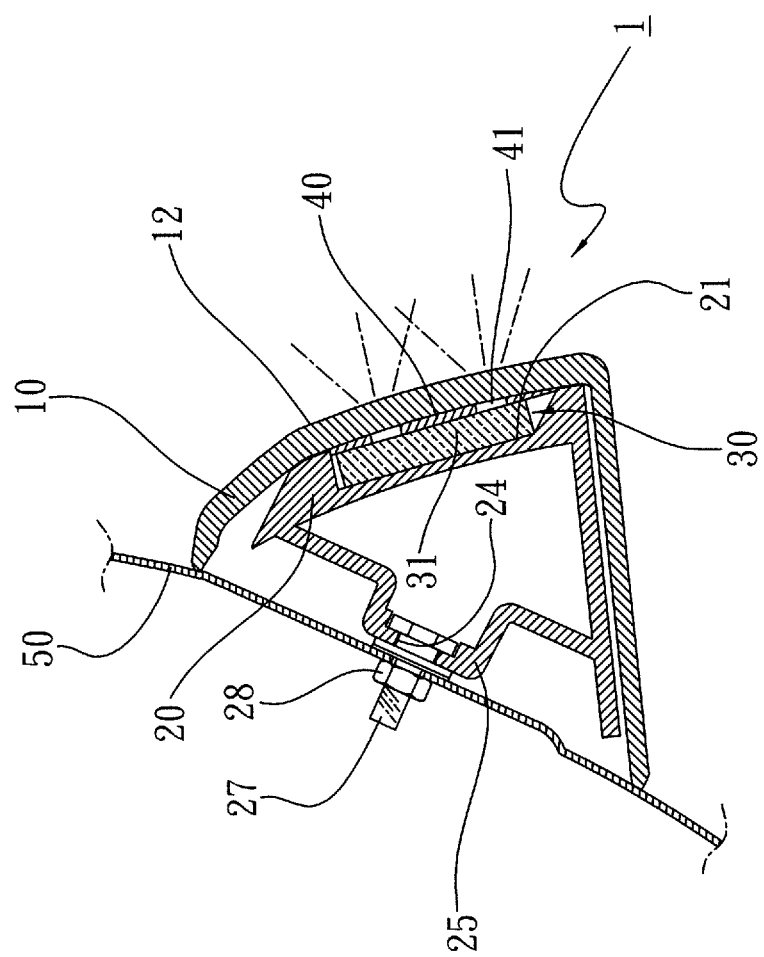
FIG. 4 is a cross-sectional view of the present invention.
Figure 5:
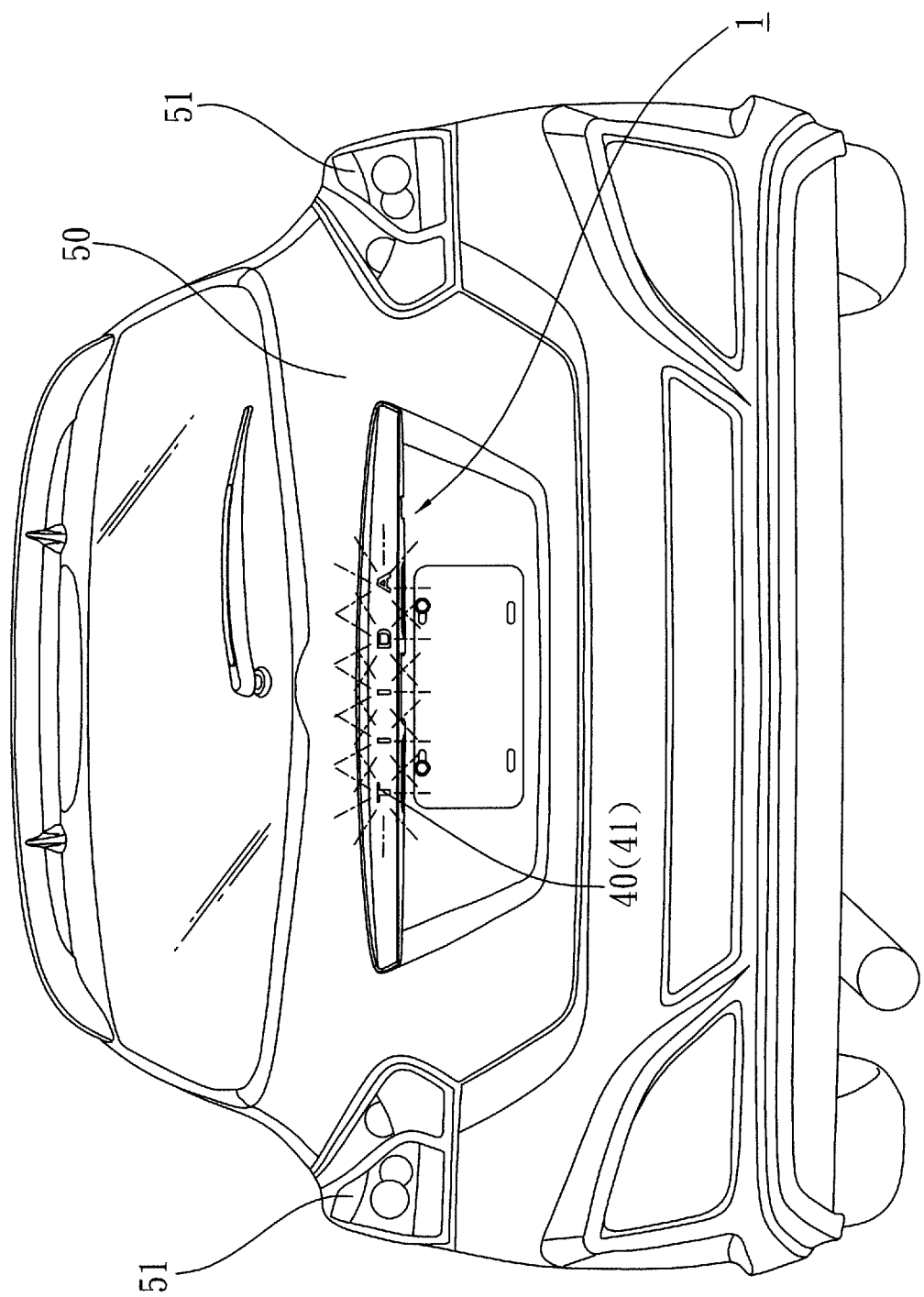
FIG. 5 is a schematic view of a preferred embodiment of the present invention upon implementation.

Referring to FIGS. 1, 4 and 5 again, when the light emitting module 30 of the decoration panel 1 is not energized (e.g. when automobile lights are not turned on in the daytime or when an automobile is not braked), a graph and/or letter pattern configured inside the decoration panel 1 is hidden due to the sputter coating film 12 on the surface of the cover 10, enabling the surface of the decoration panel 1 to display a complete electroplating effect and capable of creating a highly textured, eye-appealing metallic mirror effect as FIG. 1 shows. On the other hand, when the light emitting module 30 is energized (e.g. when automobile lights are turned on or when an automobile is braked), the LED light board is then lighted on, and the light generated from the light boards will pass through the graph and/or letter pattern configured on the letter-typed and/or graph-typed frame slots 41 of the letter plate and penetrate the sputter coating film 12 of the cover 10 so as to display a light emitting decoration panel 1 having a highly identifiable lighting effect as FIGS. 4 and 5 show. Moreover, the decoration panel 1 can display a blue light emitting effect when automobile lights are turned on because the power line 34 of the decoration panel 1 is in electric connection with an automobile tail light 51 and the LED light boards of the decoration panel 1 has a double-color light source (e.g. blue, red light sources), and the blue light emitting effect can be turned into a red light emitting effect when an automobile is braked, or a glistening warning lighting effect may be presented by means of the programming of a controller 33, further increasing driving safety.

I claim:

1. An electroplating light-transmissive decoration panel for a rear license plate, comprising:
   a cover, made of a light transmissible material, a surface thereof being formed into a sputter coating film by means of sputter coating treatment, and locking holes being configured inside said cover;
   a framework, a front side thereof being configured with a plurality of accepting grooves in communication with each other, and a rear side thereof being configured with coupling portions with a through hole, allowing screw elements to be passed through to lock in said locking holes of said cover, and a plurality of coupling portions with an engagement groove for mounting thereof on a sheet metal above a rear license plate;
   a light emitting module, configured with a plurality of LED light boards in electric connection with each other and accommodated in said accepting grooves of said framework correspondingly, one side of said light boards being in electric with a controller capable of controlling lights transform, and one end of said controller being extended with a power line for the connection thereof to a power source of a tail light; and
   a letter plate, covered in front of said LED light boards, and hollowed-out graph-typed and/or letter-typed slots being configured on said light boards.

2. The decoration panel according to claim 1, wherein said sputter coating film on said surface of said cover is in the range from 0.1 μm to 1 μm in thickness.

3. The decoration panel according to claim 1, wherein said LED light boards of said light-emitting module are made of acrylic or soft silicone gel, with surfaces thereof treated by sandblasting (matte processing), and a light bar of a double-color light source is respectively inlaid in two sides of each said light board, thereby forming a double-color light emitting effect.

4. The decoration panel according to claim 1, wherein a tail end of said power line of said light emitting module is in connection with an electric contact.

* * * * *